Dec. 11, 1923. 1,476,986

W. W. KUSTERMAN

VENTILATING DUCT CONSTRUCTION FOR DYNAMO ELECTRIC MACHINES

Filed Sept. 22, 1919

Inventor
W. W. Kusterman
by
Attorney

Patented Dec. 11, 1923.

1,476,986

UNITED STATES PATENT OFFICE.

WALTER W. KUSTERMAN, OF CINCINNATI, OHIO, ASSIGNOR TO ALLIS-CHALMERS MANUFACTURING COMPANY, OF MILWAUKEE, WISCONSIN, A CORPORATION OF DELAWARE.

VENTILATING-DUCT CONSTRUCTION FOR DYNAMO-ELECTRIC MACHINES.

Application filed September 22, 1919. Serial No. 326,094.

*To all whom it may concern:*

Be it known that WALTER W. KUSTERMAN, a citizen of the United States, residing at Cincinnati, in the county of Hamilton and State of Ohio, has invented a certain new and useful Improvement in Ventilating-Duct Constructions for Dynamo-Electric Machines, of which the following is a specification.

This invention relates to a vent duct construction for dynamo-electric machines and is particularly applicable in machines having laminated cores. It is desirable that the cores of dynamo-electric machines be provided with vent ducts through which cooling air may circulate. In machines having laminated cores the laminæ must be spaced from each other in some manner to form the vent ducts, and yet they must remain in mechanical relation so that all of the laminæ may be compressed together to form the whole compact core. It is an object of this invention to provide a vent duct construction which is simple, cheap and which may be rapidly assembled. It is a further object of this invention to provide a vent duct construction in which no welding or soldering is required. Another object of the invention is the provision of a construction in which it is impossible for a spacing element forming part of the vent duct construction to become loose and get into the air gap of the machine or damage the same otherwise. Other objects will appear hereinafter as the description of the invention proceeds.

The novel features of the invention will appear from this specification and accompanying drawings which form a part thereof and disclose two embodiments of said invention, and all these novel features are intended to be pointed out in the claims.

In the drawings Fig. 1 is a section on line I—I, Fig. 2, looking in the direction of the arrows, and shows the invention applied in a rotatable core of a dynamo-electric machine.

Figure 1:
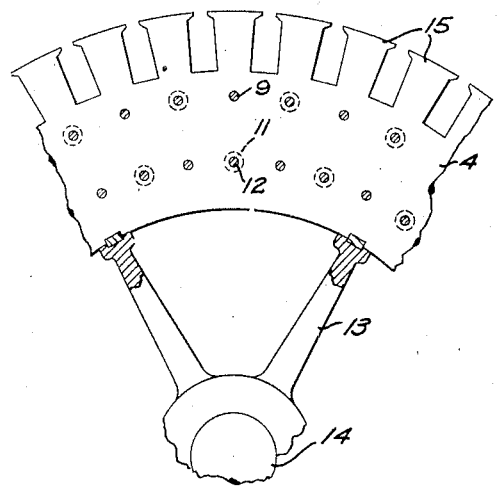

In the drawings a laminated core 1 is provided composed of laminæ 2, which latter are keyed to the spider 13 mounted on the shaft 14. The laminæ are held, at the end of the core shown, by an end plate 8. The laminæ are here shown as provided with teeth 15 but it is clear that they may have teeth of other shape or no teeth at all.

For purposes of illustrating this invention only one vent duct 5 has been shown although it is of course to be understood that there may be as many such as may be found desirable. The vent duct 5 is formed by walls comprising the laminæ 4, 6. The wall-lamina 4 is adjacent the end lamina 3 of the left hand portion of the core and the wall-lamina 6 is adjacent the end lamina 7 of the right hand portion of the core. Each wall-lamina is provided with perforations, through which perforations are disposed rivet-like members 9, 12 having heads 10, 11 respectively. The particular shape of the rivet-like spacing members is not material. In Fig. 2 only those rivet-like members appearing on the vertical section line of Fig. 1 are shown, but as will be seen from Fig. 1, any desired number of rivet-like members may be utilized.

In assembling the core and vent duct the following procedure may be followed: A lamina such as 6 which has been previously perforated has rivet-like members inserted through the perforations therein with the shanks down; a lamina as 7, for example, is then placed on top of lamina 6 and against the heads of the associated rivet-like members and fastened thereto in any temporary manner, as by tie-wires, thereby retaining the rivet-like members in place and preventing them from falling out of the perforations. The same procedure is followed with the laminæ 4, 3. The two sets of laminæ thus formed, with their associated rivet-like members, may be disposed oppositely to each other before or after placing the same on the spider 13. At that time all temporary fastenings may be removed and the completed structure, after the end plate 11 has compressed the laminæ, will be substantially as indicated in Fig. 2. It will be noted that although the rivet-like members are in no way welded or soldered to the laminæ 4, 6, yet it is impossible for any of them to become loose and entirely detached from their associated laminæ. Inasmuch as the shank end of each rivet-like member is in contact with an oppositely disposed wall lamina and the rivet-like members are in staggered relation, the opposite wall laminæ will be held in spaced relation by the rivet-like members and be slightly bent into the shape indicated in Fig. 2. While, after the vent duct has been assembled, the rivet-like members are in a sense loosely associated with the wall-laminæ, yet they are non-detachable therefrom.

Figure 2:
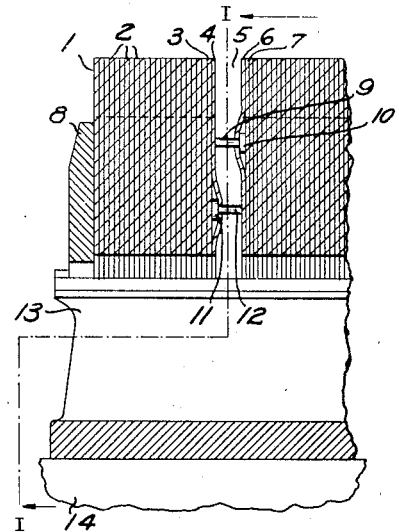
Fig. 2 is a vertical section of Fig. 1, the right hand side of the core being broken away.
Figure 3:
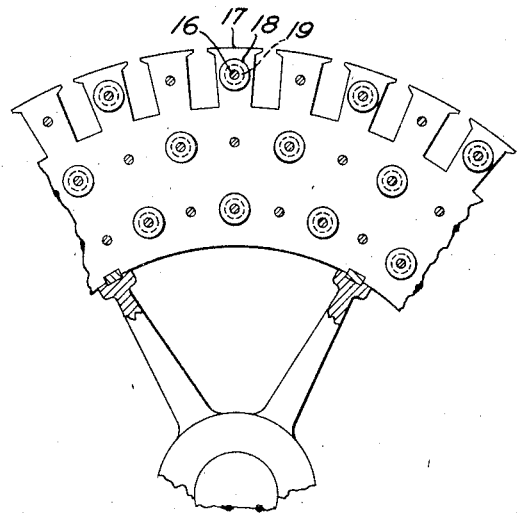
Fig. 3 is a section taken along the line III—III, Fig. 4, looking in the direction of the arrows, and shows a construction of modified form.
Figure 4:
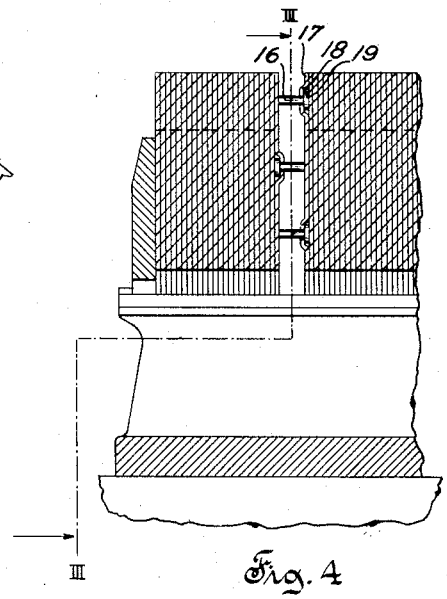
Fig. 4 is a vertical section of Fig. 3 the right hand side of the core being broken away.

Figs. 3 and 4 disclose a modification of the construction of Figs. 1 and 2 to the extent that instead of a wall-lamina as 17 being simply perforated, the portions surrounding the perforation are counter-sunk, as shown at 18, Fig. 4, so as to provide a place for the head 19 of the respective rivet-like member, bringing the latter flush with the general surface of the lamina. The counter-sinking and perforation may be accomplished at the same time as the perforating, with a suitable die.

If the core has teeth the vent duct may or may not be provided with spacing members located in the teeth as shown in Figs. 3 and 1 respectively.

It should be understood that while the invention is shown as applied in a rotating core of a dynamo-electric machine it is clearly also applicable to stationary cores.

It should be understood that it is not desired that the invention claimed be limited to the exact details of construction shown and described as various modifications will occur to those skilled in the art.

It is claimed and desired to secure by Letters Patent:

1. In a vent duct construction for dynamo-electric machines having a core, spaced laminæ forming the walls of the duct, each of said laminæ having perforations, rivet-like members disposed in said perforations having their shank ends in contact with a lamina forming an opposite wall of the duct and their head portions in contact with a portion of the adjacent core.

2. In a vent duct construction for dynamo-electric machines, a lamina having perforations, rivet-like members disposed in said perforations, another lamina spaced from said first named lamina having perforations, rivet-like members disposed in said perforations, the rivet-like members associated with one lamina extending in a direction opposite to that of those associated with the other lamina and being staggered with respect thereto.

3. In a core for a dynamo-electric machine, a plurality of laminæ, and means for spacing said laminæ apart to form a vent duct comprising solely rivet-like members loosely but non-detachably associated with oppositely disposed laminæ, said laminæ being unattached to laminæ adjacent thereto.

4. In a core for dynamo-electric machines, two laminated bodies including a pair of edge laminæ forming part of said bodies respectively, at least one of which laminæ is perforated, and means for spacing said pair of laminæ apart to form the walls of a vent duct between said bodies including means passing freely through said perforations but non-detachably associated with said laminæ, the latter being unattached to adjacent laminæ.

5. In a core for dynamo-electric machines, a pair of laminæ at least one of which is perforated, and means for spacing said laminæ apart including rivet-like members having shanks passing freely through said perforations and heads unattached to any parts in contact therewith, said latter lamina being unattached to adjacent laminæ.

6. In a core for dynamo-electric machines, comprising laminæ, a pair of laminæ forming part of said core but unattached to any part of said core in contact therewith, at least one of said laminæ being perforated, and means for spacing said laminæ apart including rivet-like members having shanks passing through said perforations and heads unattached to any part in contact therewith.

7. In a core for dynamo-electric machines, comprising laminæ, a lamina forming part of said core and having perforations, rivet-like members disposed in said perforations, another lamina spaced from said first named lamina and having perforations, rivet-like members disposed in said perforations, the rivet-like members associated with one lamina extending in a direction opposite to that of those associated with the other of said lamina and being staggered with respect thereto.

In testimony whereof, the signature of the inventor is affixed hereto.

WALTER W. KUSTERMAN.